United States Patent [19]

Sacco et al.

[11] 4,422,145

[45] Dec. 20, 1983

[54] THRASHING REDUCTION IN DEMAND ACCESSING OF A DATA BASE THROUGH AN LRU PAGING BUFFER POOL

[75] Inventors: Giovanni M. Sacco, Turin, Italy; Mario Schkolnick, Monte Sereno, Calif.

[73] Assignee: International Business Machines Corporation, Armonk, N.Y.

[21] Appl. No.: 334,272

[22] PCT Filed: Aug. 18, 1981

[86] PCT No.: PCT/US81/01109

§ 371 Date: Oct. 26, 1981

§ 102(e) Date: Oct. 26, 1981

[87] PCT Pub. No.: WO83/00758

PCT Pub. Date: Mar. 3, 1983

[51] Int. Cl.[3] .............................................. G11C 9/06
[52] U.S. Cl. ...................................... 364/300; 364/200
[58] Field of Search ....................... 364/200, 300, 900

[56] References Cited

U.S. PATENT DOCUMENTS

| 235,806 | 2/1981 | Mattson et al. | |
|---|---|---|---|
| 3,806,883 | 4/1974 | Weisbecker | 364/200 |
| 3,958,228 | 5/1976 | Coombes et al. | 364/200 |
| 4,035,778 | 7/1977 | Ghanem | 364/200 |
| 4,059,850 | 11/1977 | Van Eck et al. | 364/200 |
| 4,168,541 | 9/1979 | DeKarske | 364/200 |

OTHER PUBLICATIONS

Lang, et al., "Data Base Buffer Paging in Virtual Storage Systems", ACM Transactions on Data Base Systems, Dec. 1977, pp. 339-351.
Selinger, et al., "Access Path Selection in a Relational Data Base", Proc. 1979, Sigmod Conf. of ACM, pp. 22-34.
IBM General Information and Concepts and Installation Manuals, GH24-5012 and GH24-5013, Jan. 1981.
Denning, "The Working Set Model for Programmed Behavior", Communication of ACM, vol. 11, May 1968, pp. 323-333.
Shaw, "The Logical Design of Operating Systems", 1974, pp. 138-144.
Coffman, "Operating Systems Theory", Prentice-Hall, pp. 298-299, 1973.

Primary Examiner—Raulfe B. Zache
Attorney, Agent, or Firm—R. Bruce Brodie

[57] ABSTRACT

A CPU implementable method for minimizing thrashing among concurrent processes demand page accessing a data base through an LRU page organized buffer pool. There is ascertained the set of pages over which there is looping access behavior for the prospectively executing concurrent processes. This parameter, as determined for each task, is passed to the storage accessing component which partitions the buffer into LRU stacks and dynamically adjusts the stack to this predicted parameter size.

9 Claims, 4 Drawing Figures

COMPUTED ACCESS PATH COST FOR TWO WAYS OF PERFORMING 2-WAY JOIN.

MEASURED PAGE FAULTS VS. BUFFER SIZE FOR 2-WAY JOIN QUERY.

LOG (BASE 10) OF MEASURED PAGE FAULTS VS. BUFFER SIZE FOR 3-WAY JOIN QUERY.

MEASURED PAGE FAULTS VS. BUFFER SIZE FOR 4-WAY JOIN QUERY.

COMPUTED ACCESS PATH COST FOR TWO WAYS OF PERFORMING 2-WAY JOIN.

THRASHING REDUCTION IN DEMAND ACCESSING OF A DATA BASE THROUGH AN LRU PAGING BUFFER POOL

TECHNICAL FIELD

This invention relates to a CPU implementable method for minimizing thrashing among concurrent processes demand paging a data base through an LRU page organized buffer pool.

Background Art

Virtual memory is an address map which is larger than the available physical memory and abolishes the distinction between main and secondary memory. The concept of a one-level store can be realized by a "paging" technique. In this regard, a virtual address space is divided into "pages" of equal size and the main memory is similarly divided into page frames of the same size. Page frames are shared between processes currently being executed in a CPU system so that at any time a given process will have a few pages resident in main memory and the rest resident in secondary memory. The paging mechanism has two functions. First, it executes the address mapping operation, and secondly, transfers pages from secondary memory to main memory when required and returns them when they are no longer being used. A buffer space, termed a cache, and a cache manager implement the referencing functions. For example, an address mapping operation for paging could use a small associative store by which parallel table look-up in order to locate pages contained within the buffer could be made. The unavailability of a page in the buffer is referred to as a page fault. The remedy for a page fault requires accessing of a secondary memory (a backing store or storage sub-system) in order to obtain the requested page.

The management of a cache or buffer pool requires that consideration be given to where information is to be placed in the cache, what information is to be removed so as to create unallocated regions of cache, and when information is to be loaded; for example, on demand or in advance. Contemporary cache management involves replacement of page which has least recently been used (LRU). This involves the assumption that future behavior will closely follow recent behavior. Processes operate in context. That is, in a small time interval, a process tends to operate within a particular logical module, drawing its instructions from a single procedure, and its data from a single data area. Thus, memory references tend to be grouped into small localities of address space. The locality of reference is enhanced by the frequent occurrence of looping. The tighter the loop, the smaller the spread of references. This principle of locality is the generalization of the behavior that program references tend to be grouped into small localities of address space and that these localities tend to change only intermittently. Denning, "The Working Set Model for Programmed Behavior," Communications of ACM, Vol. 11, pp. 323-333, May 1968, applied the locality principle in the context of paged memory to formulate a so-called "working set" model. Further, he observed that the competition for memory space among processes could lead to a marked increase in the paging traffic between main and secondary memories accompanied by sudden decrease in process utilization. He still further observed that a high degree of multiprogramming makes it impossible for every process to keep sufficient pages in memory to avoid generating a large number of page faults. This means that the path connecting a backing store to a cache can be saturated in that most processes would be hung up awaiting a page transfer. This is an aspect of "thrashing." Under these circumstances, Denning proposed that each process required a certain minimum number of pages, termed "a working set," to be held in main memory before it can effectively use the CPU. If less than this number of pages were present, then the process would continually be interrupted by page faults.

Consideration should be given to the sequences of references and the effect of the presence or absence of repetitive referencing has upon a LRU organized buffer. For example, a string of single references by one process requested at a rapid rate will tend to cause its pages to go to the top of the stack and flush pages out of the buffer used by other processors. Another case where an LRU managed buffer cache behaves badly is when a process cycles through a set of pages which is larger than the set of pages that can fit into the buffer; that is, the distance between repetitive referencing instances is greater than the buffer capacity. In this case, every new reference to a page causes a fault.

Thrashing is particularly virulent when the accessing behavior among concurrent processes appears in the form of nested loops which page at substantially dissimilar rates. As previously suggested, the process executing at the higher demand rate will tend to flush all the pages of the slower loops.

The "working set" model of Denning was variously extolled as the sine qua non of LRU stack management as long as the "locality" was present. Critics, such as Shaw, "The Logical Design of Operating Systems," pp. 138-144, 1974, and even Denning himself in the text jointly authored with Coffman, "Operating Systems Theory," Prentice-Hall, pp. 298-299, appearing in 1973, acknowledged that thrashing would bring demand paging systems down, but in no way suggested a scheme for thrashing avoidance. Other references, such as Lang, et al., "Data Base Buffer Paging in Virtual Storage Systems," ACM Transactions on Data Base Systems, pp. 339-351, December 1977; and Selinger, et al., "Access Path Selection in a Relational Data Base," Proceedings 1979, SIGMOD conference of the ACM, pp. 22-34, cumulatively recited the inadequacies of the working set model and emphasized the compounding of the thrashing problem in the infinitely nested loop rich accessing environment to be found in hierarchical data bases such as IBM's Information Management System (IMS) and relational DBDM's exemplified by SQL/DS. The latter system is described in IBM General Information and Concepts and Installation manuals GH24-5012 and GH24-5013 describing SQL/DS, publicly available Jan. 31, 1981.

The co-pending Mattson, et al., U.S. patent application Ser. No. 235,806, filed Feb. 19, 1981, treats the problem of allocation as a function of hit ratio using only an abbreviated reference trace. Although allocation of page frames may be done dynamically, such a system works on a modified working set model and is not predictive in the sense of a DBDM optimizer.

THE INVENTION

This invention takes advantage of the fact that high level data base data management (DBDM) systems employ optimizers which generate an access plan in the form of a process which includes an allocation of the buffer pool to the paging tasks and an assumption (prediction) as to the locality of the paging activities. The optimizer ascertains the set of pages over which there is looping access behavior for the prospectively executing concurrent tasks. This parameter, as determined for each task, is passed to the storage accessing component which partitions the buffer into LRU stacks and dynamically adjusts the stack to this predicted parameter size.

More particularly, the invention is directed to a CPU implementable method for minimizing thrashing among concurrent processes demand page accessing a data base through an LRU page organized buffer pool. The method steps include (a) allocating to each new process an independent LRU stack of page frames (buffer elements); (b) ascertaining the set of pages over which there is looping access behavior (hot set); (c) scheduling those processes for which there exists a set of page frames large enough to hold the counterpart "hot set"; and (d) upon the occurrence of a page fault, either executing an LRU page replacement upon the counterpart stack if no pages are pinned, or assigning a page frame from the first stack comprising only unpinned pages and whose actual frame occupancy is less than the number of frames requested by the process.

DESCRIPTION OF THE PREFERRED EMBODIMENT AND INDUSTRIAL APPLICABILITY

Figure 1:
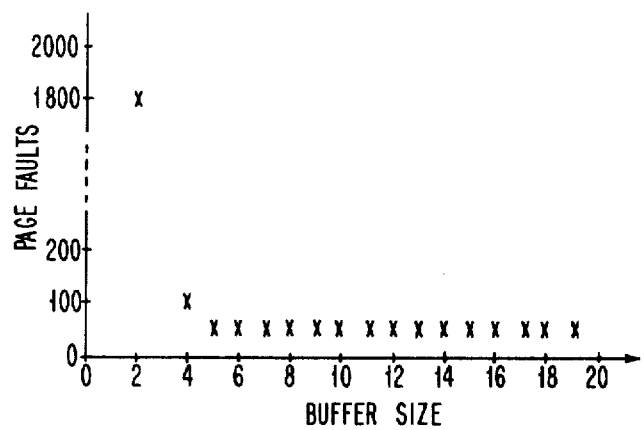
FIGS. 1-3 profile page faults as an inverse function of buffer size for respective two-way, three-way, and four-way join query when an optimizer is used to access a relational data base through an LRU page organized buffer pool.

Conceptual Aspects of the Prior Art Buffer Management Using Working Set Model The aforementioned Denning reference describes a mechanism for dealing with thrashing caused by the nesting of loops of dissimilar distance where one process steals pages or frames from another. The turmoil created is denominated "external thrashing." A buffer manager using a "working set" model defines a window T and observes the average number of different pages that are requested by a process in a period equal to T. This number is the "working set size" of the process S. A scheduler within the operating system ensures that while this process is running, at least S pages are allocated to it. Alternatively, the buffer manager can give different priorities to page requests from the various processes depending upon their working set size. Processes with a large working set size will obtain a larger page frame set than processes with small set sizes. However, in high performance data base management systems, such a mechanism has several drawbacks. If a process performs a long sequential scan on the data while at the same time requesting pages very rapidly, or nests loops of dissimilar repetitive referencing distance, then the working set model in trying to give either process many buffer frames causes external thrashing of other processes. If a process loops over a number of pages larger than the window size T as where the loop repetitive distance is greater than the buffer size, then the working set mechanism will attempt to reserve T frames for this process in the buffer where having just one frame associated with it would have caused the same level of faults to occur. Consequently, buffer page frames are poorly utilized. Further, where a process migrates from one loop of pages to the next, the working set size will temporarily increase causing this process to obtain more frames assigned to it. As before, this results in external thrashing. This may also result in scheduling problems if processes are scheduled considering their working set size requirements. Lastly, the overhead in computing working sets makes predictive methods peferable. For a general discussion of scheduling and operating systems, reference can be made to Lorin and Deitel, "Operating Systems," Addison-Wesley, 1981, Chapters 14 and 15.

The IBM System 370 Environment for Process Execution

The method of this invention is executable upon a computing system of the type including one or more CPU's, each having a main store, input/output channel control unit, direct access storage devices, and other I/O devices coupled thereto. Such a system is described in G. M. Amdahl, et al., U.S. Pat. No. 3,400,371, issued Sept. 3, 1968, and entitled "Data Processing System." The Amdahl system includes as a resource all of the facilities of either the computing system or of the operating system running thereon which are required for the execution of a process. Typical resources include a main store, I/O devices, the CPU, data sets, and control or processing programs. Furthermore, said systems are capable of "multiprogramming." This pertains to the concurrent execution of two or more processes by a computing system, and can be managed on a computer running under IBM System/360 Operating System, as described in IBM publication GC28-6646, July 1973, and listed in IBM System/360 bibliography, GA22-6822.

This invention is intended to be utilized in an operating system environment that contains a conventional data management facility (such as SQL/DS), manages auxiliary storage, and provides traditional program compiler and assembly capabilities. Although assembly level language is described in the aforementioned Amdahl patent and IBM publications, a further introduction may be found in "A Programmers Introduction to IBM System/360 Assembler Language." This bears an IBM catalog number of SC20-1846-6 as reprinted in November 1979.

The Hot Set Model

This invention takes advantage of the fact that DBDM systems, and in particular relational DBDM systems, may employ optimizers which generate an access plan in the form of a process which includes an allocation of the buffer pool to the paging task and an assumption (prediction) as to the locality of the paging activity. A description of a prior art optimizer is set out in the aforementioned Selinger, et al., reference. Additional discussion is set out in Blasgen, et al., "System R: An Architectural View," IBM System Journal, Vol. 20, No. 1, 1981, pp. 41-62, and references cited.

Figure 2:
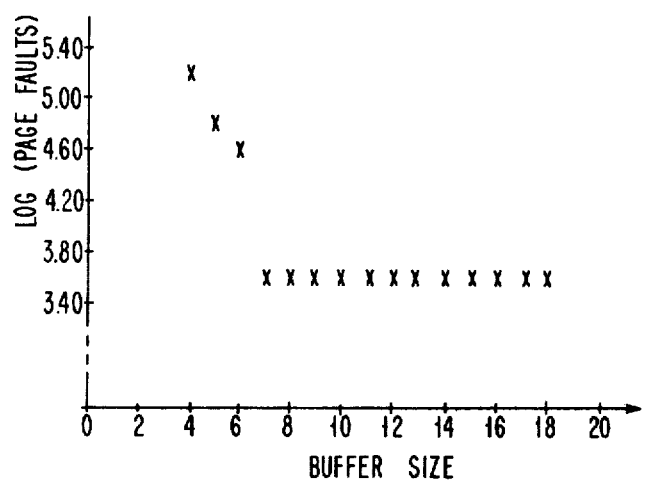
Figure 3:
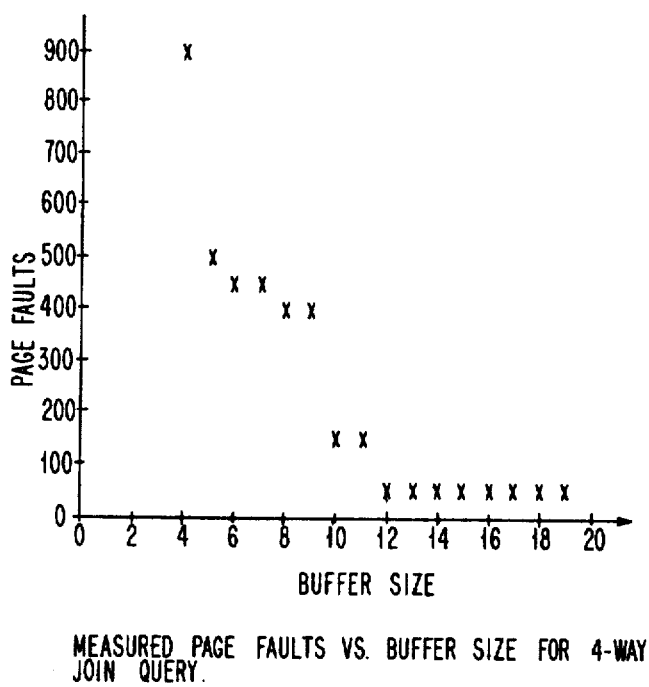

It was unexpectedly observed that since an access plan is generated by the system, then the pattern of data pages susceptible of being referenced, could also be predicted concurrently with the generation of the access plan. Further, for all plans, the pattern of accessing involves looping through sets of pages. Parenthetically, in the case of a relation scan, a loop can be defined between a control page and a data page. Significantly, the set of pages over which there is exhibited looping behavior is termed a "hot set." If the access plan to be executed utilizes a cache buffer whose size exceeds the size of the hot set, then processing can be expeditious, as the pages that are re-referenced in a loop will remain in the buffer. However, if the buffer size is below the value required to contain a "hot set," the number of page faults required grows rapidly. This behavior is illustrated in FIGS. 1-3 where the total number of page references made while processing different queries is shown as a function of buffer size. It is apparent from these FIGS. that there may be more than one looping pattern. Two or more looping patterns cause several discontinuities. Each one of these discontinuities is termed a "hot point." Also, there is minimum buffer size below which the query cannot run. This is a characteristic of relational data bases. When processing a request, a relational data base forces some pages to remain in the buffer pool, independently of the LRU page replacement step. A page forced to remain in the buffer pool is termed pinned. Because pages are pinned, the LRU management of unallocated buffer space must be accordingly modified. It should be appreciated that pinning of pages is done for performance enhancement. This is described in Lorin at pages 129 and 302.

Figure 4:
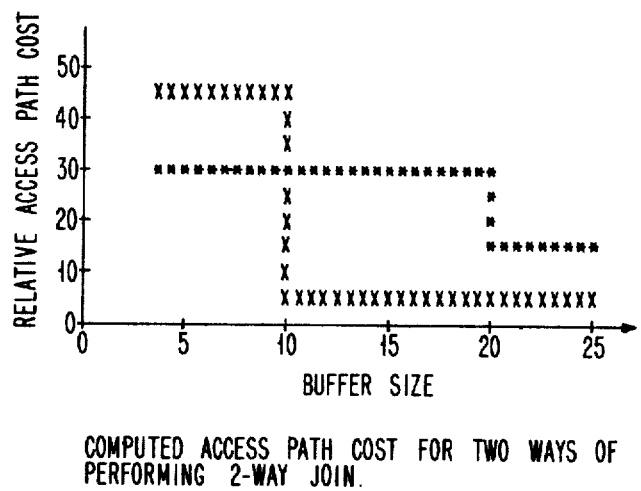
FIG. 4 depicts the relative cost for processing two-way join requests with and without the invention.

The largest hot point smaller than the available buffer size is called the "hot set size" for a query. In particular, the hot set size corresponds to the number of pages which a process could keep pinned at the same time. Examples of hot set sizes for various queries are shown in FIGS. 1-3 using a buffer size of 20 pages. The hot set sizes are 5, 7, and 12, respectively. These figures illustrate that running a query without a number of pages in the buffer equal to the hot set size is inefficient. It follows that the utilization of a predictive element is not correctly premised when it results in the use of a buffer size smaller than the hot set size determined for the access plan. Indeed, another access plan with a smaller hot set size might indeed be optimum. This is illustrated in FIG. 4 where the relative cost of two plans to compute the same result varies as a function of buffer size.

Cache Buffer Management Using the Hot Set Model

When concurrent processes demand page a data base through a LRU page organized buffer pool, a separate LRU managed chains of page frames are maintained separately, one for each process. Each chain of page frames has a maximum size equal to the hot set size for the request being serviced by that process. The buffer page frames not associated with any process are collected into a separate LRU list termed a "free list." Each committed LRU page frame chain can preferably be controlled through two parameters. These are respectively designated "numref" and "numall." "numref" defines the number of frames that are requested by a process while "numall" designates the actual number of buffer frames in the LRU list. In this invention, "numref" is equal to the hot set size of the process. "numall" $\simeq$ "numref," if at the time a process requests a LRU stack of size $\sigma$, the size of the free list is $<\sigma$. In this case, the free list contents are assigned to that LRU stack of the requesting process. This circumstance designates a "deficient free list."

When a process requests a page, a map defining the current buffer pool contents is examined to ascertain its presence or absence. This may be effectuated in several ways such as through use of an associative memory or hashing techniques. A fuller discussion of buffer/memory searching may be found in Lister, *Fundamentals of Operating Systems*, Springer-verlag, New York, Inc., Second Edition, 1979, pp. 40-60.

If the reference page is found, and if the page is also in the local buffer pool LRU stack for that process, then the local stack is updated. At the time the page is accessed, the requesting process may pin the page so as to ensure that it will not be flushed out of the buffer pool by another process while the first process is actively working on it. It is usual practice that each page have a reference counter for the purpose of keeping track of the number of times it has been pinned. When a process pins a page, its reference counter is incremented by +1. In the event that the page was not located within the buffer, then the least referenced page in the local buffer stack whose use count was 0 would be flushed out of the pool and replaced by the requested page. Note, in the event a process unpins a page, then the reference count of the page is decreased by 1.

When a process terminates, the pages of its stack are allocated to processes whose LRU stack is deficient as previously defined. The allocation is accomplished by identifying a deficient LRU stack and allocating to it the required number of free frames to complete the number of pages in its hot set size $\sigma$. If there remains unallocated page frames, then the frames may be allocated to yet another deficient process. Free frames that are unallocated to deficient processes are reassigned to the free list.

The Thrashing Minimization Method Schematized

Schematically, the method includes the steps of:

1. Initializing by assigning to the free list all of the buffer frames.

2. Allocating an empty LRU list conditioned by the invocation of each new process. In this regard, "numref"=$\sigma$"numall"=0 obtain as many as $\sigma$ page frames from the free list. Set "numall" to the number of page frames that were actually obtained. In the event that the free list size $<\sigma$, then "numall" will be $<\sigma$, the free list contains 0 frames.

3. Searching for a page in the buffer pool upon a processor request. If the page is found in the local buffer pool LRU stack, then update the stack.

If the page is not found, then a page fault occurs. It is necessary to determine whether another page must be flushed out of the buffer pool. There are two cases to consider (1) If the local stack contains unpinned pages, then flush out the least recently used page therein.

(2) If the local stack contains only pinned pages, then obtain a frame from the free list if available and flush the corresponding page. If the free list is empty, obtain a frame from another LRU stack containing an unpinned page frame. Stack that are deficient are to be preferred. Then, increase "numall" by +1. In this case, "numall" may become larger than "numref."

4. Increase the reference count by 1 if the requesting process pins a page.

5. Decrease the reference count by 1 if the requesting process unpins a page.

6. In the event a process releases a page, then no buffer activity is required.

7. Reallocate the LRU stacks among deficient processes in the event a process terminates. If there do not exist deficient processes then return frames to the free list.

IMPLEMENTATION ASPECTS

Effects of Hot Set Size Variations

Various hot sets scanned during the evaluation of the processor page frame request may be of different sizes. The optimizer associated with the data base manager, only computes an average number for the hot set size based upon the available statistics such as the sizes of the relations involved, the cardinalities of different columns, the filter factors of predicates, etc. During execution, a process may loop over a set of pages larger than the hot set size. If "numref" is larger than the maximum number of pages that the process maintains pinned simultaneously, then the LRU stack for this process is never increased. The process will suffer an internal thrashing in that it steals pages from itself. However, there will not arise any external thrashing, i.e., stealing pages from other processes. To anticipate this circumstance, the optimizer preferably should request a hot set size greater than the average it has computed. Disadvantageously, the buffer pool may become under utilized. Another alternative is the increase in the allocation of frames to a process if the free list is not empty. These frames may be released if another process requests frames from the free list and finds it empty.

Hot Set Size Equals Average Number of Pinned Pages

If the hot set size for a process is equal to the required average number of pinned pages, then it is possible to have a larger number of pages requiring simultaneous pinning than the allocated number of page frames in its LRU stack. In this case, the step of either executing an LRU page replacement on the counterpart stack if no pages are pinned or assigning a page frame from a stack containing only unpinned pages and is deficient ensures that the process gets another page. This invention is not intended to be operable when all the pages/page frames in the buffer are pinned and a request is then made for another page frame. Such an event could invoke a system reset or possibly require a dynamic extension of the buffer.

Minimizing Deficient Processes

It is desirable to minimize the number of deficient processes. This can be obtained by scheduling the requests so that the sum total of the hot set sizes of the requesting processes being serviced is less than or equal to the size of the buffer pool. Attention should be directed to restricting the set of concurrent processes, that is the multiprogramming level. Although the expectancy of processes running with stacks that are deficient is not reduced to 0, it does minimize any deadlock expectancy arising out of buffer requests while also reducing internal thrashing.

Hot Set Size Equals Minimum Hot Point

If the hot set size for processes rapidly referencing pages is said equal to the minimum hot point, that is the number of pages required to run, then the method reduces external thrashing. In order to be certain that a specified level of processes with short repetitive referencing loops may be concurrently executed, the buffer can be partitioned into two regions. A first region is dedicated to the short loops, and the second partion directed to processes executing longer loops. In this regard, the initialization step would create two free lists, each having the size of the respective region. The short loop requests would have a minimum number of frames provided. Also, in order to maintain utilization of the buffer pool, the free list for the short loops could obtain frames from the free list for the longer loops. Significantly, the stack manipulations executed on the free lists in respect of the above mentioned method steps 2 and 3, must be serialized. Since the operations that are executed include removal and insertion of pages in LRU chains, then the path link throught the critical region is the same as through the code sections of any standard buffer manager with one LRU stack.

Examples of Hot Set Size Estimation

Some relational data base systems support two different types of processing against a data base. First, ad hoc queries and updates which are usually executed only once, and second, canned programs which are installed in a program library and executed hundreds of times. In this regard, an ad hoc user at a terminal accessing a host system may enter relational queries and use the result directly at the terminal. Alternatively, the same relational queries may be embedded in a high level language stream such as PL/I or COBOL. Where the relational accessing steps are embedded in a high level language stream, a precompilation sensitive to such statements, can be invoked for parsing, optimizing, and machine language code generation, see Blasgen, et al., at pp. 49-53. This optimizer merely assigned an arbitrary size of page frames for each requesting process. In this invention however, space allocation must be efficiently provided while compiling since execution run time may be adjacent to the compiled run as found in ad hoc relation queries.

The following two examples illustrate hot set size estimating in a relational data base system. The subsequent examples are discussed in the context of Selinger, et al., where a description of the manner by which SQL/DS chooses access paths for both simple and complex queries are set out.

Among the operations available in relational systems is the capability of combining relational tables. This is termed a "join" operation. This means that two tables are to be merged on the basis of the values from one column in each table. For purposes of an example, assume that for each two-way join between relations R1 and R2, that R1 is the outer relation and R2 is the inner one.

Let p(R1) and p(R2) be the number of pages, respectively, for relation R1 and for relation R2. Let dindex (R2) be the depth of the index on R2. Further, let 1s(R2) be the number of pages in the inner loop for R2. This is determined by p(R2) divided by the number of different values for the attribute upon which the join is performed. This estimate is based upon a uniform distribution assumption. Also, let i(R2) be the number of pages in the index used to access R2. Lastly, let 1sleaf (R2) represent the number of index leaf pages scanned on an inner loop of R2. Note, that the control pages are not shared among different relations.

EXAMPLE 1

Nested Loop Join Computations:
 sequential scan on both R1 and R2 hot point = 1 + p(R2)
 index scan on R1, sequential scan on R2 hot point = 2 + p(R2)

sequential scan on R1, index scan on R2 (smooth discontinuity) interpolate between
mhp = 1 + dindex(R2) + ls(R2) and
mhp = 1 + i(R2) + p(R2)

EXAMPLE 2

Merging Scan Join Computations:
sequential scan on both R1 and R2 hot point = 1 + ls(R2)
sequential scan on R1, index scan on R2 hot point = 1 + lsleaf(R2) + ls(R2) where lsleaf (Rs) is the number of leaf pages in the inner loop.
index scan on R1, sequential scan on R2 hot point = 1 + dindex (R1) + ls(R2)

In the first example, the first hot point estimate obtained from a sequential scan of both R1 and R2 is equal to reserving enough frames to contain the entire R2 relation plus one frame to include a data page for R1. If one frame for a data page for R1 was not reserved, then access to R1 would cause the first page in the R2 loop to be replaced. Consequently, the entire set of pages in the R2 loop would be lost. For the hot point estimate based on an index scan on R1 and a sequential scan on R2, an additional frame must be reserved for the leaf pages of the index. The leaf pages will always be accessed prior to accessing the R1 data pages. The third estimate is an interpolation after a sequential scan on R1 and an index scan on R2 has been performed. The minimum number of faults is achieved when all the access entities for R2 (index and data pages) completely fit in the buffer. The number of faults will increase in an approximately linear fashion until only a number of frames sufficient to hold an average loop on the second relation become available. This assumes substantial rereferences between successive inner loops. If the number of data pages in the referenced relation is large, and the join filtering is high, then data page rereferencing will be low. In this latter circumstance, p(R2) is substituted for ls(R2). A similar reasoning chain applies to the example of hot point estimates in Example 2.

It is to be understood that a particular embodiment of the invention described above is merely illustrative and not restrictive of the broad invention. For example, the hot point set estimates are generalizable to n-way joins. They represent a conservative estimate of the hot point. The number of hot points to be estimated varies from n-1 to 3(n-1) in the case of smooth discontinuities where n is the number of relations referenced in the query. Various changes in the design, structure, and arrangement may be made without departure from the spirit of the broader aspects of the invention as defined in the appended claims.

We claim:

1. A CPU implementable method for minimizing thrashing among concurrent processes demand page accessing of a data base through an LRU page organized buffer pool, characterized in that the steps include:
   allocating to each new process an independent LRU page frame stack of buffer elements;
   ascertaining the set of pages over which there is looping access behavior by each process;
   scheduling for execution only those processes for which there exists a frame stack large enough to hold the counterpart set of pages; and
   upon the occurrence of a page fault, exercising an LRU page replacement discipline upon the counterpart stack.

2. A machine implementable method for minimizing thrashing among concurrent processes demand page accessing of a relational data base through an LRU page organized buffer pool in which some pages may be pinned, characterized in that the method steps include:
   allocating to each new process an independent LRU page frame stack of buffer elements;
   ascertaining the set of pages over which there is looping access behavior;
   scheduling for execution only those processes for which there exists a frame buffer large enough to hold the counterpart set of pages; and
   upon the occurrence of page fault, either executing an LRU page replacement on the stack counterpart to the referencing process if no pages are pinned, or assigning a page frame from any other stack formed from unpinned pages and whose actual frame occupancy is less than the number of pages ascertained for the process associated with the stack.

3. A method according to claim 2, characterized in that subsequent to the scheduling of the processes, the method comprises a further step of searching for a page in the buffer pool upon processor request and updating an associated usage counter if the page is found in the local LRU stack.

4. A method according to claim 3, characterized in that the step of updating the stack includes the step of either increasing the reference count by a constant value if the requesting process pins a page, decreasing the reference count by a constant value if the requesting process unpins a page, or avoiding updating activity in the event a process releases a page.

5. A method according to claim 2, characterized in that the method further comprises the step of either reallocating the LRU stack of page frames among deficient processes in the event a given process terminates or in the absence of deficient processes returning the frame to a common list.

6. A method according to claim 2, characterized in that the sum total of the set sizes of the requesting processes being serviced is less than or equal to the size of the buffer pool.

7. A CPU implementable method for reducing the number of page frames stolen by a first process having a paging rereferencing interval nested within the rereferencing interval of a second process, both processes demand page accessing of a data base through an LRU page organized buffer pool, characterized in that the method includes the steps of:
   allocating to each process an arbitrarily large LRU page frame stack (numref);
   ascertaining the set of pages over which there is looping accessing behavior;
   scheduling the execution of only those processes for which there exists a buffer large enough to hold the counterpart set of pages; and
   upon the occurrence of a page fault, exercising an LRU page replacement discipline upon the counterpart stack, limiting the maximum number of pages that the process maintains pinned simultaneously to a value less than the arbitrarily large LRU page frame stack, whereby a process may steal pages only from itself and not from other processes.

8. A method according to claim 7, characterized in that the LRU page replacement discipline step includes the step of either executing an LRU page replacement on the counterpart stack if no pages are pinned, or assigning a page frame from a stack containing only unpinned pages and whose actual frame occupancy is less than the number of frames requested by the process.

9. A method according to claim 7 characterized in that the upper bound of operability is constrained to the condition when all the pages and page frames in the buffer are pinned.

* * * * *